United States Patent [19]

Okamoto et al.

[11] Patent Number: 5,157,901
[45] Date of Patent: Oct. 27, 1992

[54] METHOD FOR SEALING RETORT CONTAINER

[75] Inventors: Hidefumi Okamoto, Sakai; Koji Sengoku, Nara, both of Japan

[73] Assignee: House Food Industrial Co., Ltd., Osaka, Japan

[21] Appl. No.: 663,167

[22] Filed: Mar. 1, 1991

[51] Int. Cl.$^5$ .............................................. B65B 51/10
[52] U.S. Cl. ........................................ 53/478; 156/69
[58] Field of Search ................ 156/69, 73.1, , 290, 156/308.4; 53/477, 478, 479, 425

[56] References Cited

U.S. PATENT DOCUMENTS

| | | | |
|---|---|---|---|
| 2,999,042 | 9/1961 | Meister | 53/479 X |
| 3,063,890 | 11/1962 | Saumsiegle | 156/308.4 |
| 3,868,287 | 2/1975 | Lewyckyj | 156/290 X |
| 3,892,058 | 7/1975 | Komatsu et al. | 53/479 X |
| 3,930,041 | 12/1975 | Komatsu et al. | 53/478 X |
| 4,106,262 | 8/1978 | Aterianus | 53/450 |
| 4,379,008 | 4/1983 | Gross et al. | 53/478 X |
| 4,586,317 | 5/1986 | Bussell | 53/479 X |
| 4,752,349 | 6/1988 | Gebel | 156/308.4 X |
| 4,870,800 | 10/1989 | Kasai | 156/69 X |

FOREIGN PATENT DOCUMENTS

| | | | |
|---|---|---|---|
| 52-128790 | 10/1977 | Japan . | |
| 53-43353 | 11/1978 | Japan . | |
| 154118 | 12/1980 | Japan | 156/308.4 |
| 62-31061 | 2/1987 | Japan . | |
| 62-193907 | 8/1987 | Japan . | |
| 3236634 | 10/1988 | Japan | 156/69 |

Primary Examiner—John Sipos
Assistant Examiner—Daniel B. Moon
Attorney, Agent, or Firm—Oblon, Spivak, McClelland, Maier & Neustadt

[57] ABSTRACT

A method for sealing a retort container comprises the steps of heat-sealing an opening of a retort container after charging contents into the container so that a line-seal having a width ranging from 0.5 to 2.5 mm is formed to thus seal the container and then performing knurled sealing at a portion including the line-seal. The sealing method can provide a container having sufficient seal strength and does not spoil the beautiful appearance of the flange portion of the container even if contents thereof remain in the flanged portion or the like. Moreover, the method does not cause foaming in the sealed regions at all and it is not necessary to perform the sealing treatment under substantially severe conditions to prevent the occurrence of the foaming and, therefore, the method can provide containers having a sealed portion easily peelable.

10 Claims, 3 Drawing Sheets

METHOD FOR SEALING RETORT CONTAINER

BACKGROUND OF THE INVENTION

The present invention relates to a method for hermetically sealing a retort container filled with various substances, in particular foods to be packaged.

Conventional sealing methods in which heat-sealing method is utilized include, for instance, one-stage sealing methods and two-stage sealing methods. The one-stage sealing method includes, for instance, a method comprising the steps of covering the opening portion of a container with a plastic film or the like and then subjecting the flanged portion of the opening to formation of ring-like line-seal to thus seal the container; a method comprising sealing whole the flanged portion of a container; and a knurled sealing method comprising adhering the whole of the flanged portion of a container in spot-like patterns.

On the other hand, techniques concerning the two-stage sealing method include, for instance, a two-stage-sealing technique which comprises contact-heating the upper side of a flange at the upper end of a container to perform the first sealing and then forming V-grooves or the like on the flange portion including the first seal to perform the second sealing as disclosed in Japanese Utility Model Unexamined Publication (hereunder referred to as "J.U.M. KOKAI") No. Sho 62-31061 which relates to the shapes of package-seal of a container for accomodating egg cooked in the form of bean curd, or the like; a two-stage sealing technique comprising the steps of heating the whole surface of a flanged portion under pressure to perform temporary sealing, then heating under pressure in the form of a ring to form a ring-like seal as disclosed in Japanese Patent Unexamined Publication (hereunder referred to as "J.P. KOKAI") No. Sho 62-193907 which relates to a method for forming a seal for a container capable of easily being opened and an apparatus for practicing the method); a method comprising performing the first sealing to form non-welded portions so that the non-welded portions or leakage paths form patterns which extend towards the outer side of the periphery of a tray, the patterns being separated from and independent of the first welded portion, and then performing the second seal by welding the outer side of the periphery so that a non-welded portion is formed as disclosed in J.P. KOKAI No. Sho 52-128790 which relates to a method for packaging a tray; and a method comprising the steps of forming the first seal so that gaps for evacuating air remaining in a package and then performing the second seal for complete sealing as disclosed in Japanese Patent Publication for Opposition Purpose (hereunder referred to as "J.P. KOKOKU") No. Sho 53-43353 which relates to a method for sealing a heat-sealable aluminum container.

It is a matter of course that the foregoing sealing is performed after contents are introduced into a container, but it is often observed that the contents are scattered during the filling operation and the scattered contents adhere to portions to be sealed, for instance, the flange portion of the container. Moreover, if a container is filled with contents up to the brim, a substantial amount of the contents often remains at the flange portion of the container. If the flange portion of the container in such a condition is sealed with a sealing material according to the foregoing sealing method, the following problems arise:

(i) If the method for forming a ring-like line-seal at the flange portion of a container is adopted, the contents of the container remain in the external and/or internal areas of the sealed part or the sealing material causes curling near the outer side of the seal, which impairs the appearance of the resulting goods.

(ii) If a method for sealing the whole of the flange of a container is adopted, it is necessary that the sealing must be performed under relatively severe conditions to ensure a sufficient sealing strength (for instance, sufficient resistance to retort). In this connection, the severe conditions mean conditions at high temperatures and/or under high pressures. Therefore, the contents remaining at the sealed portion cause foaming, this spoiling the beauty of the flange portion and the foaming results in insufficient sealing.

(iii) If the knurled sealing method for adhering the entire portion of the flange of a container in spots is adopted, it is necessary that the sealing must be performed under substantially severe conditions to ensure a sufficient sealing strength (for instance, sufficient resistance to retort). Therefore, contents remaining between the spots cause foaming which becomes a cause of insufficient sealing. For this reason, the exterior and the interior of the container being in communication with each other, and correspondingly the contents become putrefied.

(iv) If a method which comprises first performing entire sealing and then ring-sealing is adopted, contents remaning in the sealed portion cause foaming which impairs the appearance of the resulting good.

SUMMARY OF THE INVENTION

Accordingly, a primary object of the present invention is to provide a method for sealing a retort container which makes it possible to achieve sufficient sealing strength and can provide a sealed portion having good appearance.

This and other objects will be apparent from the following description and Examples.

The present invention has been completed on the basis of a finding that foaming of foods adhered to portions to be sealed which is observed during sealing can effectively be prevented by first performing line-sealing at the opening of a retort container and then performing knurled-sealing under rather mild conditions.

According to the present invention, the foregoing objects can effectively be achieved by providing a method for sealing a retort container which comprises the steps of heat-sealing an opening of a retort container after charging contents into the container so that a line-seal having a width ranging from 0.5 to 2.5 mm is formed to thus seal the container and then performing knurled-sealing at a portion including the line-seal.

BRIEF EXPLANATION OF THE DRAWINGS

The present invention will be more apparent from the following detailed description described with reference to the attached drawings, wherein.

DESCRIPTION OF THE PREFERRED EMBODIMENTS

Figure 1:
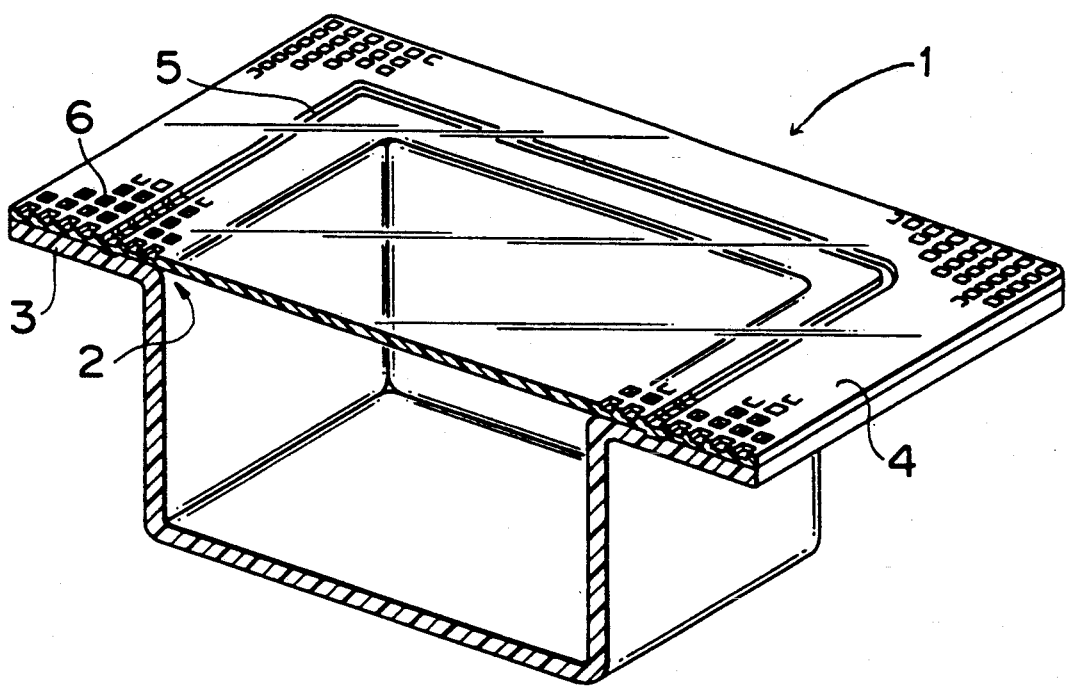
FIG. 1 is a perspective view of a counterpart of the container sealed according to the method of the present invention which is cut into two parts.
Figure 2:
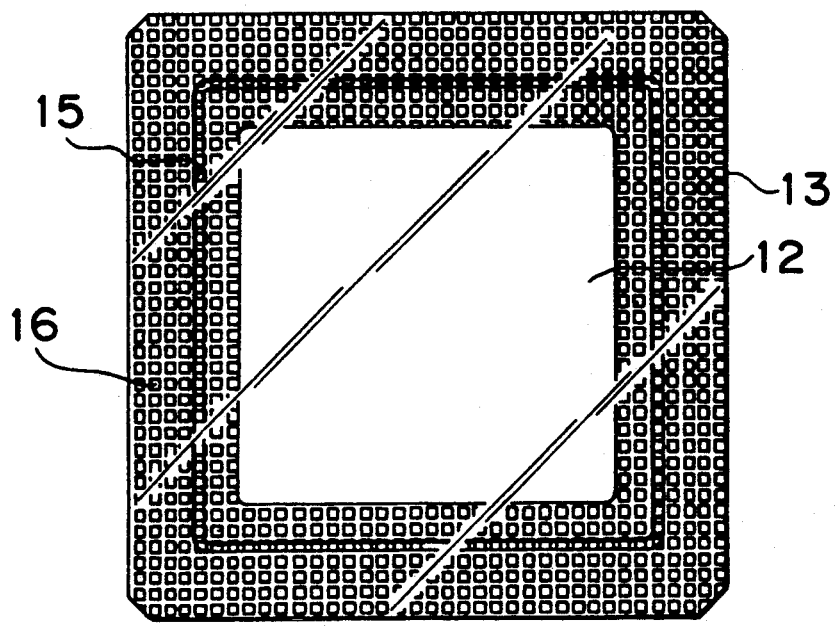
FIG. 2 is an enlarged plan view of the flange portion of a sealed container.
Figure 3:
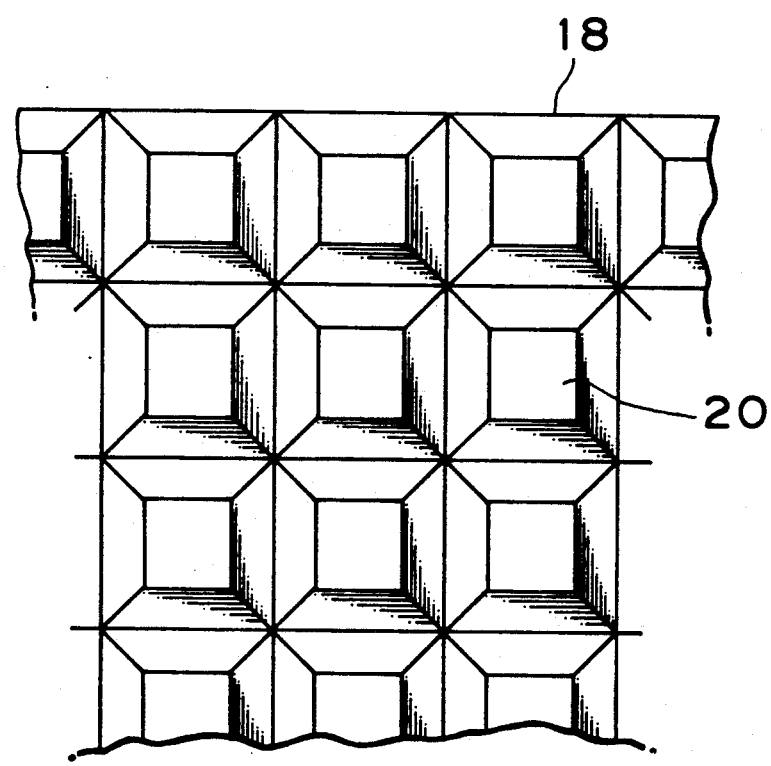
FIG. 3 is an enlarged plan view of a hot plate of a knurled sealing machine which is observed from down below.
Figure 4:
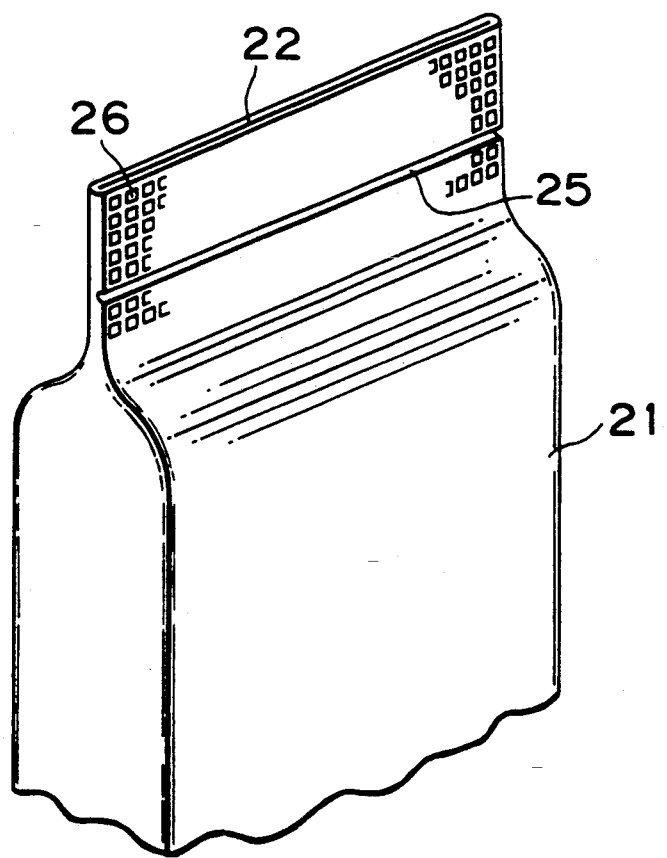
FIG. 4 is a perspective view of a part of the retort pouch-container sealed according to the method of the present invention.

The present invention includes a variety of embodiments. For instance, a first embodiment comprises putting a plastic film 4 on the top of an opening portion of a container or preferably a container 1 which comprises an opening 2 at the upper portion and a flange portion 3 at the periphery of the opening 2 to cover the opening portion and forming a line-seal 5 and then a knurled seal 6 at the flange portion 3 as shown in FIG. 1 and a sealed container produced by the first embodiment comprises the line-seal 15, the knurled seal 16, the flange portion 13 and the opening 12 as shown in FIG. 2. The knurled seals 6 and 16 result from the use of the hot plate shown in FIG. 3 having a sealing plane 18 and an embossed portion 20. A second embodiment comprises, as shown in FIG. 4, closing the opening portion 22 of a bag-like container 21 such as a retort pouch and then forming a line-seal 25 and then a knurled seal 26 at the opening 22.

The containers preferably used in the first embodiment are those having a flanged portion or a flange (width thereof ranging from 5 to 12 mm) and the materials thereof are, for instance, thermoplastic resins such as polypropylene resins, polyethylene resins, polyvinylidene chlorides and ethylene/vinyl alcohol copolymers; or laminated materials of the foregoing resins or of combinations of the foregoing resins with steel sheets.

The cap materials (or sealing materials) for covering the opening portions of containers may be any materials capable of being welded to the container and specific examples thereof are resin films such as polypropylene, polyethylene terephthalate, polyvinylidene chloride and nylon films; or an aluminum foil or a laminated materials thereof. The thickness of these cap materials ranges from 70 to 140$\mu$ and preferably 85 to 105$\mu$.

Examples of the retort pouches used in the second embodiment of the invention are bag-like containers prepared from thermoplastic resins such as polypropylene resins, polyethylene resins, polyvinylidene chlorides and ethylene/vinyl alcohol copolymers; or laminated materials of the foregoing resins or of combinations of the foregoing resins with aluminum foils. The thickness of the wall of the container preferably ranges from 70 to 230$\mu$.

In the method of the present invention, contents are charged in the container and then the opening thereof is covered with a cap material such as a film in the first embodiment or the opening is closed in the second embodiment for the subsequent sealing of the container.

Examples of the contents to be charged into the containers are not restricted to specific ones so long as they can withstand the conditions for retort sterilization treatment and may be liquid substances and paste-like substances which may contain solids. Specific examples thereof include soybean milk, egg cooked in the form of bean curd and yoghurt.

These contents can be introduced into containers in the usual manner. The method of the present invention is effective, in particular when a packaging is performed by a method in which a relatively large amount of the contents remains at the flanged portion of the container, for instance, the container is fully packed with the contents. The method of the invention makes it possible to effectively seal the container without removing the contents adhered to the flanged portion thereof.

In the present invention, the container is first subjected to heat-sealing to form a line-seal having a width ranging from 0.5 to 2.5 mm, preferably 1 to 2 mm to thus seal the container. This is because, if the width of the line-seal is less than 0.5 mm, the container is insufficiently sealed, while if it is more than 2.5 mm, the contents possibly remain at the sealed portions. This becomes a cause of foaming. The line-sealing is preferably performed at a temperature ranging from 170° to 220° C. for 1.0 to 3.0 seconds at a pressure to be applied onto the sealed plane ranging from 10 to 40 kg/cm$^2$ in such that 2.6 to 6.8 kg/15 mm of a sealing strength can be ensured after the sealing treatment.

Thus, there can be ensured a sealing strength after retort sterilization ranging from 2.3 kg/15 mm to 6.0 kg/15 mm. If the sealing strength attained by the foregoing sealing treatment is less than 2.6 kg/15 mm, the desired seal strength after the retort sterilization, i.e., not less than 2.3 kg/15 mm, cannot be ensured. On the other hand, if the seal strength accomplished after the sealing treatment is more than 6.8 kg/15 mm, the packaging materials may melt or be cut up into pieces by fusion during the sealing treatment. Moreover, when a transparent film is used as a covering material, it becomes cloudy at the sealed portion. In addition, a substantial force is needed for peeling off the sealed portion.

If the pressure to be applied onto the sealed plane is less than 10 kg/cm$^2$, a desired sealing strength cannot be attained and correspondingly a container is insufficiently sealed partially or entirely. On the other hand, if it is more than 40 kg/cm$^2$, the sealing strength is extremely high and thus the sealed portion cannot easily be peeled off or the covering material is cut up.

Preferred conditions for the sealing treatment are a temperature ranging from 180° to 210° C. and a pressure to be applied onto the sealed plane ranging from 15 to 30 kg/cm$^2$ and the treating time ranging from 1.5 to 2.5 seconds.

In this respect, the term "pressure to be applied onto the sealed plane" herein means a numerical value obtained by dividing the weight of a hot plate by the area of the portion to be sealed, i.e., a pressure applied to the portion to be sealed.

In the method of this invention, a portion including the foregoing line-sealed portion is then subjected to a knurled-sealing treatment. The term "knurled-sealing" herein means a sealing treatment in which the sealed portions form a gridiron pattern and in which the ratio of sealed areas to non-sealed areas ranges from 1/9 to 6/4. The conditions for the knurled-sealing are such that the sealed portions are not peeled off and the knurl sealing is carried out, for instance, at a temperature ranging from 170° to 240° C. and a pressure to be applied onto the sealed plane ranging from 10 to 40 kg/cm$^2$ for 1 to 3 seconds.

The width of the knurled-seal is not restricted to a specific range, but preferably the entire surface of the flange portion or the flange portion of the container which lies outside the line-seal for the first embodiment; or the entire region from the line-seal to the opening of the container for the second embodiment is subjected to the knurl-sealing treatment. The width of the region to be sealed in general ranges from 3 to 20 mm and preferably 5 to 12 mm.

The container sealed by the method of the present invention is then retort-sterilized in the usual manner.

Since the width of the ring-like line-seal formed by the method of this invention is narrow, contents of the container does not remain at the line-seal portion. Therefore, foaming is not caused even if the line-sealing treatment is performed under relatively severe conditions. In other words, a seal having sufficient sealing strength can be ensured since insufficient sealing due to, for instance, foaming is not observed at all.

In the subsequent knurled-sealing treatment, the sealing treatment must not be performed under substantially severe conditions since the flanged portion of the container and the covering material have already been sufficiently adhered to one another by the previous line-sealing. More specifically, it is sufficient to perform the knurled-sealing treatment under conditions such that the portions sealed through the knurled-sealing are not peeled off during storage, transportation or the like. For this reason, the contents remaining in the flange portion other than the line-sealed portion do not cause foaming during the knurled-sealing treatment and, therefore, the beauty of the flange portion of the container is not spoiled. Moreover, a plurality of spot-like sealed portions are formed through the knurled-sealing and the knurled-sealing treatment imparts beautiful appearance to the resulting sealed container. In other words, even if the contents remain at the flange portion of a container, the knurled-sealing does not impair the beautiful appearance thereof and effectively prevent the foaming of the contents during the sealing treatment.

The sealing method of the present invention can provide sealed containers having sufficient sealing strength and does not spoil the beautiful appearance of the flange portion of a container even if contents of the container remain at the flange portion or the like. Moreover, the method of the invention does not cause foaming at the sealed portions at all and it is not necessary to perform the sealing treatment under substantially severe conditions to prevent the occurrence of the foaming and, therefore, the method can provide containers having a sealed portion easily peelable.

The present invention will hereunder be described in more detail with reference to the following non-limitative working Examples and the effect practically achieved by the present invention will also be discussed in detail in comparison with Comparative Examples given below.

EXAMPLE 1

To a container equipped with a flange as shown in FIG. 1 (width of the flange portion: 7 mm; inner volume: 150 ml; thickness of the container wall: 700μ; made from polypropylene), there was added 150 ml of a soybean milk-coagulating agent mixture, then the upper opening portion was covered with a film of PET/nylon/PP having a thickness of 95μ (11 cm×11 cm), a line-seal having a width of 1.5 mm was formed by welding the film to the flange portion of the container at 190° C. and 24 kg/cm² for 1.6 second to thus seal the container.

Then a knurled-seal having a width of 7 mm was formed on the portion including the line-sealed region under conditions of 200° C. and 30 kg/cm² for 1.6 second.

Thereafter, the container thus sealed was retort-sterilized at 121° C. for 22 minutes. The strength observed after the retort sterilization (heat seal strength) was determined and found to be 3.1 kg/15 mm. No foaming was observed at the sealed portion and the appearance of the sealed portion was excellent. The heat-seal strength was determined according to the following method:

Method for Determining the Heat-Seal Strength

The heat-sealed portion of the packaged container sealed in a width of 15 mm is cut off and opened. Then the both edges of the opened portion are pulled towards the upper and lower directions respectively with a pulling speed of 300 mm/min to determine the maximum load required for peeling off the sealed portion (Schopper tensile tester available from Nippon Rigaku Co., Ltd.).

Comparative Example 1

A container was sealed in the same manner used in Example 1 except that the knurled-seal was not performed. The raw material remained outside the sealed portion, the sealed portion was curled at that portion and the appearance was not good.

Comparative Example 2

The same procedures used in Example 1 were repeated except that the entire flange portion of a container was sealed under conditions of 200° C. and 10 kg/cm² for 1.6 second instead of the line-sealing and knurled-sealing treatments performed in Example 1. Foaming occurred over a wide area and the appearance thereof was unsatisfactory.

Comparative Example 3

The same procedures used in Example 1 were repeated except that the entire flange portion of a container was knurl-sealed under conditions of 230° C. and 30 kg/cm² for 1.6 second instead of the line-sealing and knurled-sealing treatments performed in Example 1. Foaming occurred over a wide area and the appearance thereof was unsatisfactory. The exterior and interior of the container were in communication with each other because of insufficient sealing due to the foaming.

Comparative Example 4

The same procedures used in Example 1 were repeated except that knurled-sealing was first performed under the conditions of 205° C. and 30 kg/cm² for 1.6 second and then the line-sealing was performed under the conditions of 185° C. and 24 kg/cm² for 1.6 second to thus seal a container. All of the foaming portions were present on the line-seal and correspondingly there was observed insufficient seal in the line-sealed portion.

EXAMPLE 2

To a standing pouch of PET/aluminum/PP having a thickness of 95μ (size: 120 mm×170 mm; inner volume: 200 ml), there was added 200 ml of soybean milk, the opening portion of the container was closed and a line-seal having a width of 1.5 mm was formed at this portion under the conditions of 190° C. and 24 kg/cm² for 1.6 second.

Then a knurled-seal having a width of 6 mm was formed in region including the line-sealed portion under the conditions of 200° C. and 30 kg/cm² for 1.6 second.

Thereafter, the container was subjected to retort sterilization treatment at 121° C. for 18 minutes. There was not observed any foaming at the sealed portion and the appearance of the sealed portion was excellent.

The heat-seal strength after sealing, that observed after retort sterilization as well as conditions of the sealed portion of the sealed containers produced in Examples 1 and 2 and Comparative Examples 1 to 4 are summarized in the following Table 1.

TABLE 1

| Ex. No. | 1 | 1* | 2* | 3* | 4* | 2 |
|---|---|---|---|---|---|---|
| Heat-seal strength after Sealing (kg/15 mm) | 3.5 | 3.3 | 3.5 | 3.2 | 3.6 | 3.7 |
| Heat-Seal Strength after Retort Sterilization (kg/15 mm) | 3.1 | 2.8 | 3.0*1 | 2.7*2 | 3.1*3 | 3.2 |
| Conditions of the Sealed Portion | | | | | | |
| Number of Foaming Portion | 0 | 0 | 7 | 9 | 6 | 0 |
| Foaming/Seal (area ratio) (%) | 0 | 0 | ≈22 | ≈4 | ≈2 | 0 |

*: Comparative Example
Please note that these data *1 to *3 mean the heat-seal strength of the sealed portion including foaming portions:
*1: 2.8 kg/15 mm
*2: 2.4 kg/15 mm
*3: 0.8 kg/15 mm As seen from the results listed in Table 1, when only the line-seal is applied (Comparative Example 1), the beauty of the exterior of the sealed portion is very low. In addition, when the entire sealing (Comparative Example 2) or only the knurled-sealing (Comparative Example 3) was performed, foaming was observed due to the food adhered to the sealed plane. Moreover, it was also found that the problem of foaming could not be solved by a method which comprises first carrying out knurled sealing and then line-sealing (Comparative Example 4).

On the contrary, the method of the present invention can provide excellent sealed containers having no foaming portions at the sealed plane (see Examples 1 and 2).

What is claimed is:

1. An improved method for sealing a retort container having an opening and a flange portion to prevent foaming in the portion to be sealed and to have good sealing strength and appearance, comprising the following sequential steps:

(a) charging contents into said container,
    (b) covering said opening and said flange portion of said container having said contents charged therein with a cap material,
    (c) subsequently heat-sealing the opening and flange portion of said container so covered with said cap material to form a line-seal having a width of from 0.5 to 2.5 mm to effect sealing of said container and preventing foaming of contents in the flanged portion, and
    (d) subsequently knurled-sealing said flange portion, including said line-seal, of the heat-sealed container to form a knurled-seal of good sealing strength and appearance without foamed portions.

2. The method of claim 1 wherein the width of the line-seal ranges from 1 to 2 mm.

3. The method of claim 1 wherein the line-seal is formed so that sealing strength attained after the heat-sealing ranges from 2.6 to 6.8 kg/15 mm.

4. The method of claim 3 wherein the heat-sealing to form a line-seal is carried out at a temperature ranging from 170° to 220° C., and a pressure ranging from 10 to 40 kg/cm² for 1.0 to 3.0 seconds.

5. The method of claim 1 wherein the knurled-sealing to form a knurled-seal is carried out at a temperature ranging from 170° to 240° C., and a pressure ranging from 10 to 40 kg/cm² for 1.0 to 3.0 seconds.

6. The method of claim 1 wherein the width of the knurled-seal ranges from 3 to 20 mm.

7. The method of claim 1 wherein said flange portion of the container has a width ranging from 5 to 12 mm and the cap material is a plastic film.

8. The method of claim 7 wherein the container is formed from a thermoplastic resin or a laminate of thermoplastic resins or a laminate of a thermoplastic resin and a steel sheet.

9. The method of claim 7 wherein the plastic film is a polypropylene, polyethylene terephthalate, polyvinylidene chloride or nylon film, an aluminum foil or a laminate thereof.

10. The method of claim 9 wherein the thickness of the plastic film ranges from 70 to 140μ.

* * * * *